C. T. RAYON.
BALING PRESS.
APPLICATION FILED DEC. 19, 1910.
1,003,371.
Patented Sept. 12, 1911.
2 SHEETS—SHEET 2.
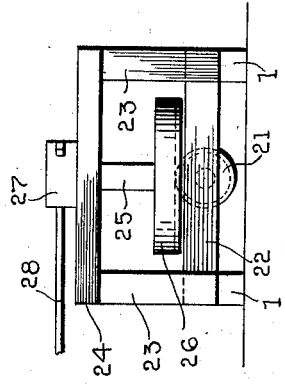
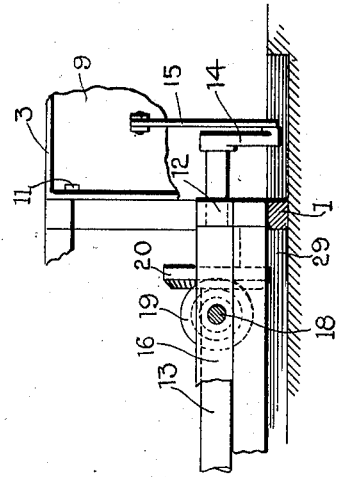
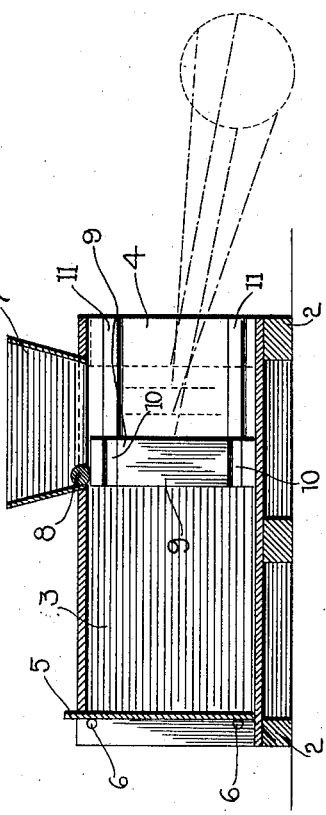
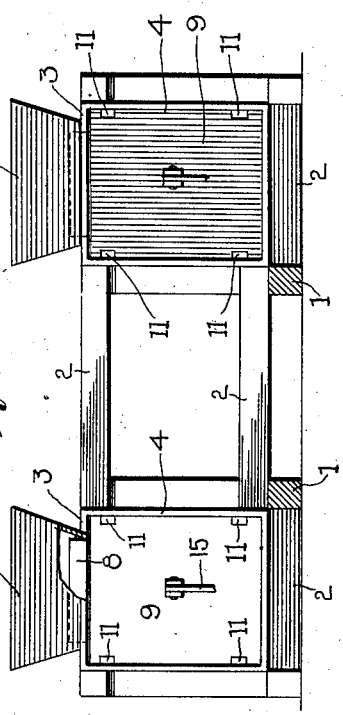
Inventor
CYRIL T. RAYON

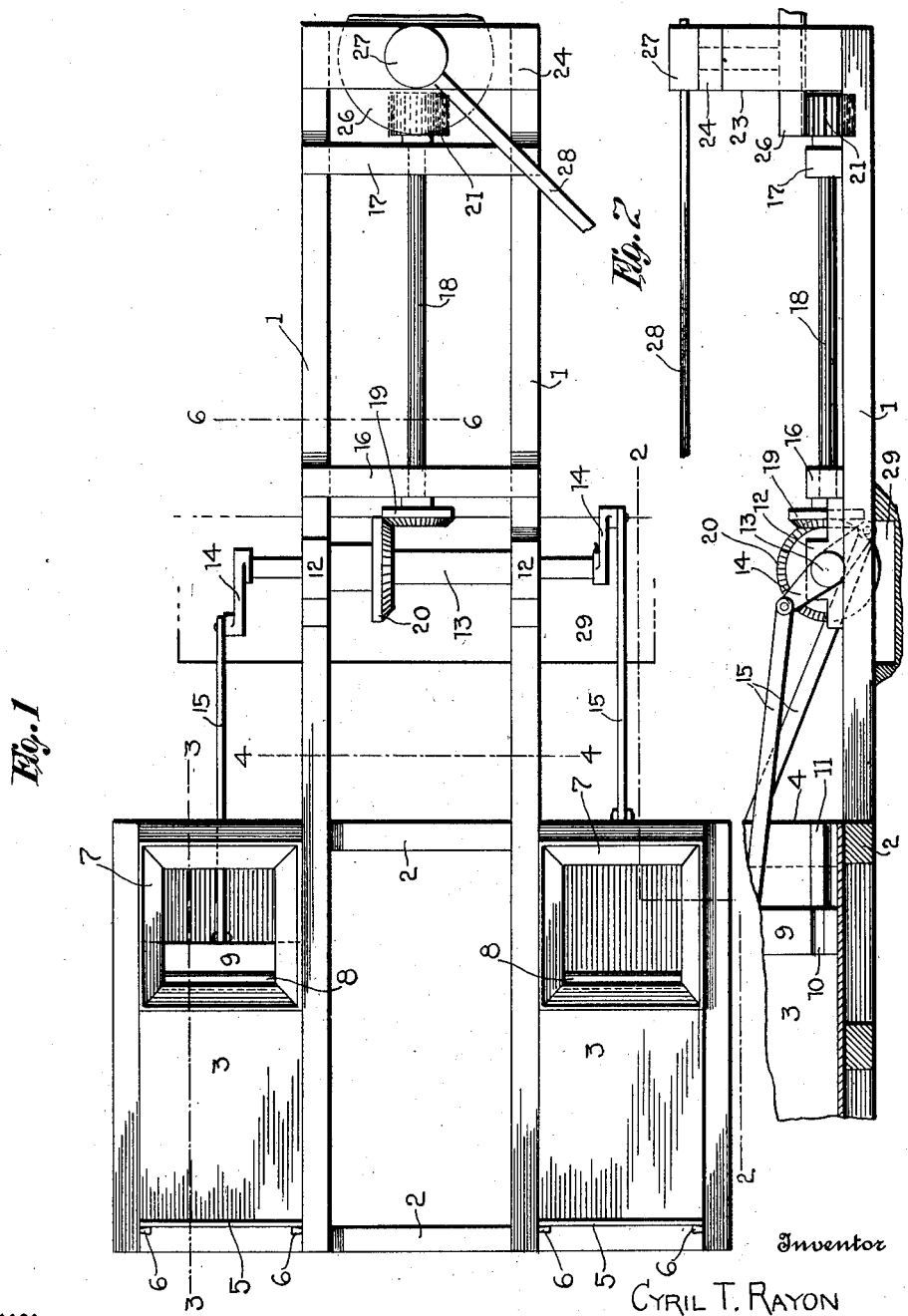

UNITED STATES PATENT OFFICE.

CYRIL T. RAYON, OF CHURCH POINT, LOUISIANA.

BALING-PRESS.

1,003,371. Specification of Letters Patent. Patented Sept. 12, 1911.

Application filed December 19, 1910. Serial No. 597,986.

*To all whom it may concern:*

Be it known that I, CYRIL T. RAYON, a citizen of the United States, residing at Church Point, in the parish of Acadia and State of Louisiana, have invented certain new and useful Improvements in Baling-Presses, of which the following is a specification, reference being had therein to the accompanying drawing.

This invention relates to baling presses, and the principal object of the same is to provide a press that can be operated by manual, horse, or other power and in which a pair of press boxes and suitable pressing mechanism therefor is provided so that two bales can be formed simultaneously.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a top plan view of the improved baling press. Fig. 2 is a fragmentary longitudinal sectional view taken on the line 2—2, Fig. 1. Fig. 3 is a longitudinal sectional view taken on the line 3—3, Fig. 1, the plunger rod being shown diagrammatically by dotted or broken line. Fig. 4 is a transverse sectional view taken on the line 4—4, Fig. 1. Fig. 5 is a view in front elevation of the driving means for the pressing mechanism. Fig. 6 is a fragmentary transverse sectional view taken on the line 6—6, Fig. 1.

The improved baling press comprises a base support formed of a pair of elongated beams 1 which are arranged in spaced parallel relation and which are connected at their rear portions by the transversely arranged bars 2 which are in spaced parallel relation and project well beyond the outer longitudinal sides of beams 1 and have the press boxes 3 seated thereon. The press boxes 3 are preferably rectangular in shape, their front ends 4 being open and their rear ends normally closed by the slides 5 which are vertically movable between the rear ends of said boxes and guiding and holding pins 6 carried by the rear ends of the sides of the boxes. The upper ends of said slides 5 project above the tops of the boxes 3 so that they can be readily raised to open the rear ends of said boxes to facilitate the removal of bales therefrom. Hoppers 7 are carried by the front portions of the tops of boxes 3 through which the material to be baled is fed. Rollers 8 are arranged within the bases of the hoppers 7 at their junction with the boxes 3 and are in position to contact with the upper edges of the plungers 9 that are slidable in said boxes. Said plungers have guiding grooves 10 formed transversely in the upper and lower portions of their sides for slidable engagement with the cleats 11, carried by the forward end portions of the boxes 3 so that said plungers will be limited to longitudinal movements relative to said boxes.

Beams 1 are provided with oppositely disposed bearings 12 at points in advance of the forward ends of the boxes 3, and said bearings carry a transverse shaft 13 the projected ends of which are provided with cranks 14 which have pitman connections 15 with the plungers 9.

The forward portions of beams 1 are connected by the spaced parallel bars 16 and 17 which have a drive shaft 18 journaled therein. Said shaft 18 is supported in spaced parallel relation to beams 1 by bars 16 and 17 and its projected rear end carries a bevel gear 19 that is in mesh with a similar, but preferably larger, gear 20 fast on shaft 13. The forward end of drive shaft 18 carries a pinion 21. The forward ends of beams 1 are connected by a transverse bar 22, and said forward ends carry the standards 23. The upper ends of standards 23 are connected by a transverse bar 24, and said bar 24 and bar 22 carry a vertical shaft 25 upon which a horizontally arranged master gear 26 is fastened and which is in mesh with the forward pinion 21 of shaft 18. The upper end of shaft 25 projects above bar 24 and is equipped with a collar 27 from which an operating rod 28 projects and to which manual draft or mechanical power may be applied to rotate shaft 25.

In use, the improved baling press is seated on the ground or other supporting surface and to provide clearance space for the rotary movements of the cranks 14 and gear 20, an opening 29 is formed in said supporting surface.

From the foregoing it will be seen that by rotating rod 28, reciprocating power will be imparted to the plungers 9 within the boxes 3 so that two bales can be simultaneously formed. It will also be seen that the cleats 11 and grooves 10 guide the plungers in their reciprocating movements in the boxes 3, and that the plungers are prevented from having frictional contact with the rear ends of the hoppers 7 by means of the rollers 8. And it will be clear that said rollers also facilitate the passage of material that is to be baled through the hoppers 8.

What I claim as my invention is:—

A press comprising longitudinally extending bars, parallel cross bars positioned at one end of said longitudinally extending bars and extending to each side thereof, press boxes mounted upon the outer portions of said cross bars, oppositely disposed journals mounted upon said longitudinally extending bars, a driving shaft mounted in said journals, plungers mounted in said press boxes and connected with said shaft, cross bars mounted upon the opposite end portions of said longitudinally extending bars from said press boxes, journals mounted upon said last mentioned cross bars, a longitudinally extending shaft mounted in said last mentioned journal, gears connecting said shafts, a housing formed at the opposite end of said longitudinally extending bars from said press boxes, a vertical shaft mounted in said housing, and extending above the same, gears connecting said vertical shaft with said longitudinal shaft, and means connected with the upper end of said vertical shaft for rotating the same.

In testimony whereof I hereunto affix my signature in presence of two witnesses.

CYRIL T. RAYON.

Witnesses:
JERRY J. HIGGINBOTHAM,
J. E. RICHARD.

---

Copies of this patent may be obtained for five cents each, by addressing the "Commissioner of Patents, Washington, D. C."